(12) United States Patent
Norgard et al.

(10) Patent No.: US 9,032,634 B1
(45) Date of Patent: *May 19, 2015

(54) TRANSPARENT MEASURING DEVICE WITH ENHANCED VIEWING WINDOWS

(71) Applicant: Rulersmith IP, Inc., Shoreline, WA (US)

(72) Inventors: Elmer J. Norgard, Bellingham, WA (US); David A. Ray, La Conner, WA (US)

(73) Assignee: Rulersmith IP, Inc., Shoreline, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,580

(22) Filed: Dec. 3, 2014

Related U.S. Application Data

(63) Continuation of application No. 14/104,847, filed on Dec. 12, 2013, now Pat. No. 8,904,661.

(51) Int. Cl.
*G01B 3/04* (2006.01)
*B43L 7/00* (2006.01)

(52) U.S. Cl.
CPC .... *G01B 3/04* (2013.01); *B43L 7/00* (2013.01)

(58) Field of Classification Search
CPC .................................. G01B 3/04; B43L 7/00
USPC .................................................. 33/493, 1 B
See application file for complete search history.

(56) References Cited

U.S. PATENT DOCUMENTS

| | | | |
|---|---|---|---|
| 304,245 A | 8/1884 | Thomas |
| 526,926 A | 10/1894 | Litell |
| 1,421,975 A | 7/1922 | Meyers |
| 2,171,504 A | 8/1939 | Keuffel et al. |
| 2,459,694 A | 1/1949 | Gordon |
| 2,463,868 A | 3/1949 | Gutridge |
| 3,412,470 A | 11/1968 | Williams et al. |
| 4,024,831 A | 5/1977 | Sperling |
| 4,475,288 A | 10/1984 | Pellegrom |
| 4,559,705 A | 12/1985 | Hodge et al. |
| 4,742,771 A | 5/1988 | Heilig |
| 4,779,346 A | 10/1988 | Schafer |
| 4,942,670 A | 7/1990 | Brandt |
| 5,557,996 A | 9/1996 | Reber et al. |
| 5,819,422 A | 10/1998 | Schafer |
| 6,158,135 A | 12/2000 | Rank |
| 6,311,408 B1 | 11/2001 | Madayag |
| 6,434,844 B1 | 8/2002 | Rank |
| 6,460,266 B1 | 10/2002 | Painter et al. |
| 6,839,971 B2 | 1/2005 | Schafer |
| 6,854,189 B2 | 2/2005 | Schafer |
| 6,925,724 B2 | 8/2005 | Tandy |
| 6,973,737 B2 | 12/2005 | Terrazas |
| 7,043,850 B2 | 5/2006 | Brady |

(Continued)

FOREIGN PATENT DOCUMENTS

FR 753009 10/1993

*Primary Examiner* — Christopher Fulton
(74) *Attorney, Agent, or Firm* — Seed IP Law Group PLLC

(57) ABSTRACT

A tool for measuring, marking, or cutting material, the tool formed of a rigid sheet of transparent material having a plurality of lines formed thereon, and a plurality of windows formed in the lines to enable viewing of material underlying the tool. The windows can be outlined in opaque lines, and alternating windows can be filled with contrasting transparent colors.

15 Claims, 5 Drawing Sheets

(56) References Cited

U.S. PATENT DOCUMENTS

| | | |
|---|---|---|
| 7,251,898 B2 * | 8/2007 | Schafer et al. .................. 33/1 B |
| 7,509,745 B2 * | 3/2009 | Schafer et al. .................. 33/1 B |
| 8,011,111 B2 | 9/2011 | Brady |
| 8,904,661 B1 * | 12/2014 | Norgard et al. ................. 33/494 |
| 2002/0095805 A1 | 7/2002 | Hsu |
| 2008/0120859 A1 | 5/2008 | Eversdijk |
| 2009/0158602 A1 * | 6/2009 | Lockyer .......................... 33/1 B |

* cited by examiner

TRANSPARENT MEASURING DEVICE WITH ENHANCED VIEWING WINDOWS

BACKGROUND OF THE INVENTION

1. Field of the Invention

The present invention pertains to tools for use in measuring and marking material, and, more particularly, to a transparent ruler having composite lines with apertures for viewing underlying material.

2. Description of the Related Art

Transparent rulers having grid lines formed thereon are known for use in measuring and marking material, such as fabric, paper, plastic, and the like. These rulers are also used to guide a tool, such as a razor, knife, or rotary cutter, in cutting the material to desired sizes and shapes.

Most rulers use single color opaque markings for aligning material for measurement and cutting. The opaque line, which is usually black, interferes with viewing the underlying material, which can cause inaccurate alignment, marking, and cutting. The utilization of a single color line makes the ruler less versatile for use on light and dark materials. This was solved by superimposing another contrasting wider line behind the first line.

One such ruler is that described in U.S. Pat. No. 4,779,346 for a transparent measuring device that includes a plurality of continuous two-color lines of contrasting colors. In use, these lines are visible against a background of multiple colors, thus facilitating the measuring and marking of underlying material.

Although this ruler has markings that are now more versatile, these markings are wider and provide more interference with viewing the material on which the ruler is placed. For example, a user will have difficulty in visually aligning the underlying material with the line. One approach is to use dashed lines to solve this. However, if the dashed lines are of a single color they will only be visible on either a light or dark material. Superimposing the line with a contrasting color improves visibility but interferes with seeing the underling material. Making the line transparent also helps, but it is still difficult for the user to accurately see what is underneath the ruler.

BRIEF SUMMARY OF THE INVENTION

In accordance with the disclosed embodiments of the invention, a device for measuring and marking material is provided that includes a transparent, rigid substrate having opposing first and second planar sides, one of which comprises a working surface that bears against the material, a plurality of lines formed on at least one of the opposing first and second planar sides, and a plurality of clear windows formed at spaced intervals along at least one of the plurality of lines, each window surrounded by the line in which it is formed.

In accordance with another aspect of the present disclosure, the at least one line of the plurality of lines is a composite line formed of contrasting colors.

In accordance with a further aspect of the present disclosure, a transparent measuring device is provided that includes a sheet of transparent material having opposing surfaces; one or more multicolor lines applied to one of the opposing surfaces on the sheet, and at least one window formed in each of the one or more multicolor lines. Ideally each window is surrounded by the line in which it is formed.

In accordance with another aspect of the present disclosure, each window is outlined with an opaque line, preferably of a black color.

In accordance with yet another aspect of the present disclosure, a device for use in measuring material is provided that includes a transparent substrate of rigid material having a plurality of lines formed thereon; and a plurality of clear windows enclosed within at least one line of the plurality of lines.

In accordance with a further aspect of the present disclosure, a ruler is provided that includes a transparent substrate of rigid material having a working surface and an opposing viewing surface; a composite line formed of multiple lines of contrasting colors on the substrate, a first line of the composite line having a dark color that comprises a perimeter line around the composite line, and the second line comprising an interior of the composite line that is surrounded by the first line and that is of a contrasting lighter color to the dark color of the first line; an interior space within the second line that is clear; and a plurality of windows within the interior space that enable viewing from the viewing surface to the working surface of the substrate.

In accordance with still yet another aspect of the present disclosure, a method is provided that includes the steps of forming a plurality of parallel perimeter lines of a dark color on a transparent substrate of rigid material that define a first line having an interior with a first width; forming a plurality of parallel border lines of a dark color within the interior of the first line that are parallel to the perimeter lines and that define a second line in the interior of the first line, the second line having an interior space between the border lines of a second width that is less than the first width of the first line; forming a plurality of contiguous windows in the interior space of the first line; and applying a transparent color that is lighter than the dark color of the perimeter lines and the border lines in the interior of the first line and not in the interior space of the second line.

As will be readily appreciated from the foregoing, the present invention avoids the disadvantages of prior methods and achieves a ruler that enhances the ability to view the underlying material. The clear openings or windows that are outlined in black allow the user to see through to the actual material that he or she is working with in order to provide for increased measurement and cutting accuracy.

BRIEF DESCRIPTION OF THE DRAWINGS

The foregoing features and advantages of the disclosed embodiments of the invention will be more readily appreciated as the same become better understood from the following detailed description when taken in conjunction with the accompanying drawings wherein.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with transparent measuring devices, rulers, cutting guides and the inks used thereon as well as manufacturing processes for the same have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
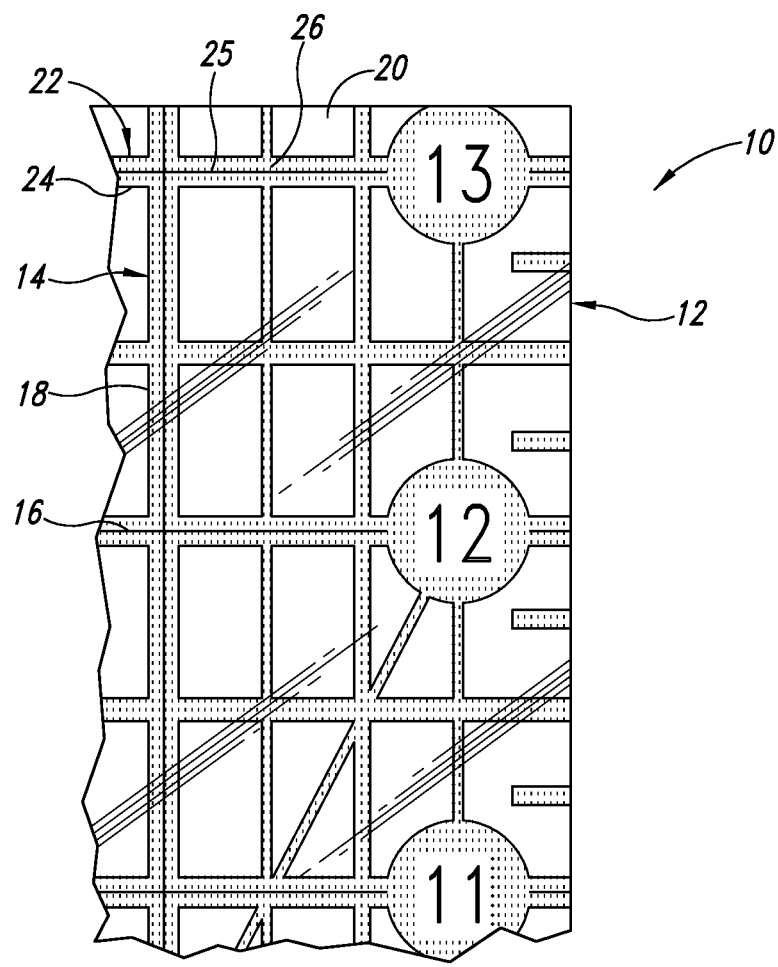
FIG. 1 is a plan view of a known tool for measuring material utilizing composite color lines.

Referring initially to FIG. 1, illustrated therein is a portion of a transparent measuring device 10 having lines 14 formed in accordance with previous methods. The lines 14 are formed from a first line 16 of darker color or hue and a second line 18 of a contrasting color or hue. These lines 16, 18 may be opaque, translucent, or transparent. Preferably, the second line 18 will be visible on both sides of the first line 16 when viewed from the front surface 20 of the sheet 12.

More particularly, the method of forming these composite multicolored lines 14 requires that both lines 16, 18 be visible to the user when viewing underlying material. For example, in this construction, multicolor composite line 22 in FIG. 1 has the lower portion 24 and top portion 26 visible on respective sides of the darker center line 25. In order to manufacture this ruler with accurate alignment of the lines, multiple images must be applied via a screen printing process as is known in the art and which will not be described in more detail.

Figure 2:
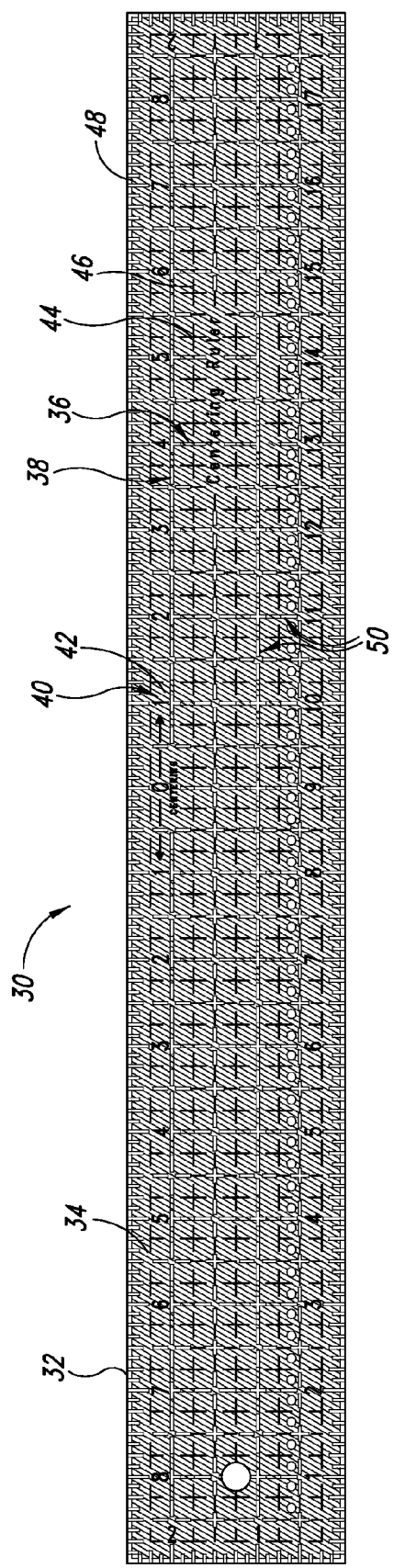
FIG. 2 is a plan view of a transparent measuring device formed in accordance with the present disclosure.
Figure 3:
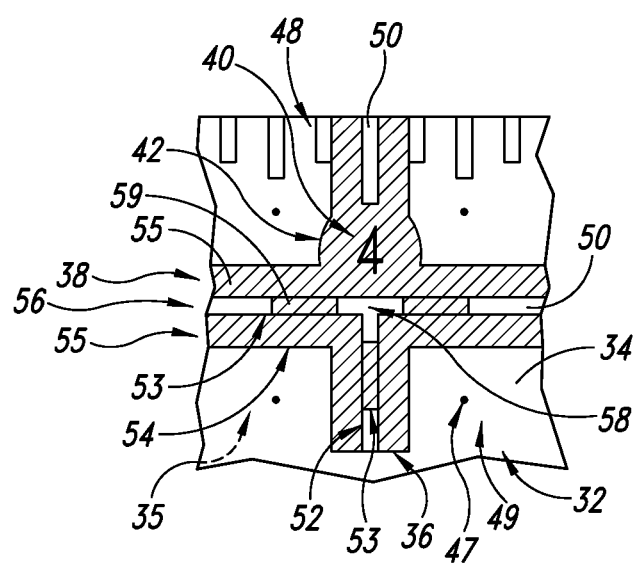
FIG. 3 is an enlarged plan view of a portion of the device of FIG. 2 illustrating a representative embodiment of the clear viewing windows.

In accordance with the present disclosure, a transparent measuring device 30 is shown in FIG. 2 having a rigid sheet of transparent material 32, preferably clear acrylic, with a front surface 34 and opposing back surface 35 (shown in FIG. 3). More particularly, a pattern of vertical and horizontal lines 36, 38 is formed on the back surface 35 of the rigid sheet 32, the pattern including the vertical lines 36 formed along the width of the sheet 32 and a plurality of horizontal lines 38 formed along the width of the sheet 32. The vertical lines 36 and the horizontal lines 38 are positioned substantially at right angles with respect to one another to thereby create a grid pattern of squares. In addition to the vertical lines 36 and the horizontal lines 38, it is possible to include angled lines 39 (shown in FIG. 4) to form angles, such as 30°, 45°, or 60°, with either the vertical or horizontal lines 36, 38. Such angled lines enable a user to orient the device 30 at these angles so that the material can be measured, marked, or cut at an angle to a given line.

For purposes of illustration, FIG. 2 shows the lines 36, 38 formed on the back or working surface 35 of the measuring device 30. However, it will be understood that the lines could equally well be formed on the front surface 34 of the rigid sheet 32, but this is not preferred due to parallax errors resulting from the distance between the lines 16, 18 and the work piece or material under the device 30. Combinations of front and back surface lines may also be used. The vertical and horizontal lines 36, 38 may be formed by any suitable printing process, such as by a silk screen, lithograph press, or photographic process, by an engraving process such as laser engraving, or by combinations of the above techniques.

Also, although not shown, selected vertical and horizontal lines 36, 38 may be composite lines formed of a first line and a second line. The first line would be of a first color (or hue) and the second line of a second color (or hue) that is different from the first color. Preferably, the first line is superimposed upon the second line, and the first line is of a lesser breadth than that of the second line, such that the second line is visible on each side of the first line when viewed from the front surface. However, the first line and the second line may also be placed in adjacent or partially overlapping relationship, so long as the two different colors are visible from the front surface. The first and second colors are of a contrasting nature, such as yellow and dark green, white and black, dark orange and light blue, black and yellow, or other combinations such that either one of the colors will be visible against backgrounds of various colors or against a multicolored background.

In the illustrated embodiments, selected horizontal and vertical lines are identified by consecutive numbers 40. The numbers 40, preferably of a dark or black color, are positioned within an enlarged circle 42, preferably of a second lighter color. As illustrated, the numbers 40 correspond to the distance of each respective vertical line 36 from an edge of the device 30 or from a center reference line as shown in FIG. 2 with the number "0." The units are preferably in inches, although other units may be used. Vertical subdivision lines 44 and horizontal subdivision lines 46 are placed between the vertical lines 36 and the horizontal lines 38. In addition, subdivision marks 48 are shown placed at equal intervals on the outside edges along the length and width of the measuring device 30. In addition, alignment dots 47 are located in the areas 49 between the composite lines 36, 38, preferably spaced equidistantly apart within each area 49 except on the diagonal in which case they are spaced further apart, which is shown more clearly in FIG. 5.

Formed within the vertical and horizontal lines 36, 38 are a plurality of horizontal and vertical viewing windows 50. These windows 50 are shown more clearly in the enlarged partial view of FIG. 3. Each window 50 is embedded within its host line 36, 38 so as to be complete surrounded thereby. As shown in FIG. 3, the window has a rectangular geometric shape outlined with two pair of dark border lines, i.e., elongate parallel border lines 52 and transverse parallel border lines 53, which are preferably opaque lines in black or other dark color, such as dark-shade green. The elongate lines 52 are of a length greater than a length of the shorter transverse lines 53. However, it is to be understood that both sets of lines can be of equal length to form a square shaped window. Other geometric shapes may be used for the windows 50, such as trapezoid, etc. However, the rectangular shape is preferred in order to maximize the viewing portal within the larger rectangular host lines 36, 38.

Each of the host lines 36, 38 is preferably outlined by a dark perimeter line 54 that is identical to or substantially similar in thickness and color to the border lines 52, 53. Between the perimeter line 54 and the border line 52 is an interior area 55 that is preferably colored with a bright transparent color that contrasts with the color of the perimeter line 54 to form a composite two-color line. The parallel border lines 52 are also parallel to the perimeter lines 54 and define between them a central longitudinal interior space 56 that is preferably centered between the parallel perimeter lines 54. Each window 50 is defined within this interior space 56 by the parallel longer segments of the border lines 52 and the parallel short transverse border lines 53.

Ideally, alternating windows 59 are filled in with the same transparent color as used within the interior area 55 of the host lines 36, 38. This presents a dashed window line appearance within the central longitudinal space 56. Because alternating windows 59 are present within the central longitudinal space 56, it is possible to not utilize the dark transverse border lines 53, if desired. In addition, a window 58 formed at the intersection of a vertical line 36 and horizontal line 38 has a "T" shape, which provides additional viewing ability at the junction of the host lines 36, 38.

The colors used on the device 30 can vary according to consumer preference and the particular application. Combinations include lavender and black, neon green and black, yellow and dark green. However, any light and dark combination can work.

The number of windows 50 per line 36, 38 and per measuring device 30 will depend on the size of the device and the size of the lines. The preferred size range for the windows is 0.022 inch to 0.044 inch, with an absolute range of 0.018 inch to 0.25 inch. Preferred range for opaque lines that form the windows are 0.012 inch to 0.03125 inch, with an absolute range of 0.01 inch to 0.0625 inch. The transparent color preferred range is 0.1 inch to 0.25 inch with an absolute range of 0.05 inch to 0.5 inch. The lengths will vary depending on the design and the size of the measuring device or ruler. All of the foregoing ranges are inclusive of their end values unless otherwise stated. In addition, the transparent color could also be a flood coat applied over the entire surface 34.

Figure 4:
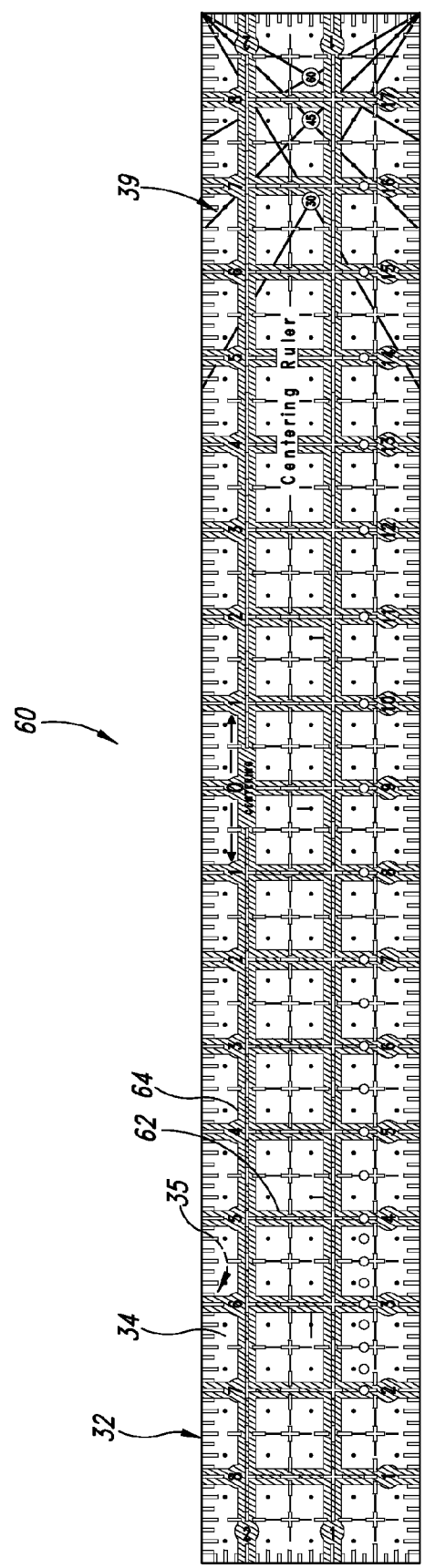
FIG. 4 is a plan view of another version of a transparent measuring device formed in accordance with the present disclosure.
Figure 5:
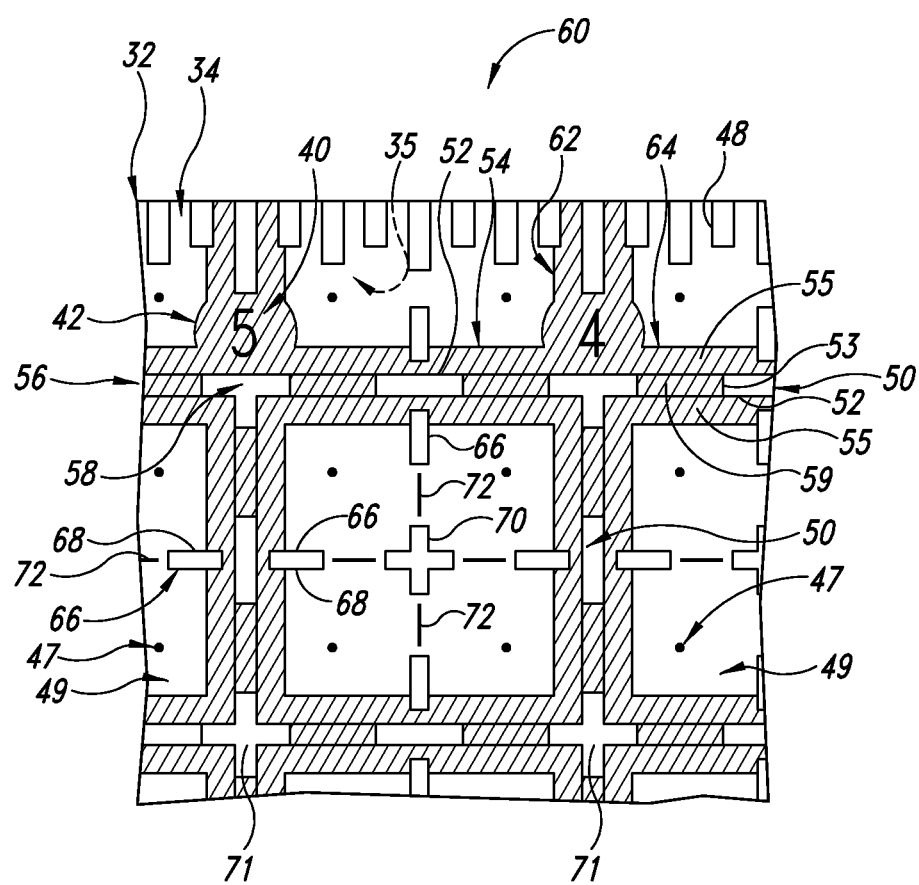
FIG. 5 is an enlarged plan view of a portion of the device of FIG. 4 illustrating an alternative embodiment.

Referring to FIGS. 4 and 5, shown therein is a measuring device 60 that is similar to the measuring device 30 described above in FIGS. 2 and 3. For ease of reference, similar aspects of this device 60 will bear the same reference numbers used in the description of the device 30 from FIGS. 2 and 3. In this version, the measuring device 60 has the transparent substrate 32 with a top surface 32 and opposing working surface 35. A grid of vertical and horizontal composite lines 62, 64 are formed on the working surface 35 as well as the angled lines 39 described above.

The area of the device 60 not covered with lines is transparent and not colored, unlike the measuring device 30 in FIG. 2. In addition, the device 60 includes finer graduation lines 66 in the form of transparent rectangles outlined with a dark border line 68. These graduation lines 66 are oriented both vertically and horizontally between the larger composite lines 62, 64. Where these graduation lines 66 intersect, a transparent cross 70 is formed. Interposed between the transparent graduation lines 66 are solid dashed lines 72. In addition, the transparent graduation lines 66 can overlap onto the composite lines 62, 64, in which case the area of overlap is transparent and not of the same color as the composite lines 62, 64. It is to be understood that the transparent graduation lines 66 and transparent cross 70 may be filled in with an opaque color or transparent color if desired. In addition, where the composite lines 62, 64 intersect, a cross-shaped window 71 is formed, preferably of a larger size than the transparent cross 70.

The embodiments described herein are preferably constructed of clear acrylic, ⅛" thick for durability and rigidity. The acrylic will be laser cut to size for accuracy and polished edges. The opaque lines will be screen printed first on the back of the acrylic (the working surface) to form the windows. The opaque lines will be superimposed by another layer of screen printing on the working surface that forms a contrasting transparent line. This layer will also fill alternating windows to increase visibility across light and dark surfaces.

In the embodiment where the rigid sheet is configured to have the composite two-color lines formed thereon, the method disclosed in U.S. Pat. No. 5,819,422 can be used to apply the composite lines to the back or working surface of the rigid sheet.

The process for making the transparent measuring devices can be done by a variety of methods. Although the use of ink to create the images is described herein, other materials or processes may be used, including pigment, toner, photographic deposit, and photosensitive emulsion.

The preferred method is the screen printing process because it permits the application of a heavy deposit of ink. Alternatively, present methods do permit the direct transfer of an electronic or computer image to a print screen, bypassing the step of using an ortho film, although this is much more expensive. In addition, a lithograph press, an engraving process, thermal (hot) stamping of foil, or a photographic process may also be used, as well as any combination of graphics and manufacturing. Finally, high-speed laser printers that print the computerized image directly to a plastic sheet are also available. Virtually any pigment transfer method may be used to generate the images of the present invention on the transparent sheet. Another method takes advantage of precision cutting equipment to cut out pre-printed adhesive plastic that can be applied as a layered substrate to the transparent sheet.

The following is one method for forming the measuring device 30 or ruler in accordance with the present disclosure. A transparent sheet 32 of material or substrate having mutually opposing planar sides 34, 35 is provided. One side is designated as the working side 35, which will be applied to the working material on which the device or ruler is applied, and the opposing side is the viewing side. A plurality of parallel perimeter lines of a first color are formed on the substrate, preferably on the working surface 35, that define a first line having an interior with a first width. Next, a plurality of parallel border lines of a second color are formed within the interior of the first line that are parallel to the perimeter lines and define a second line parallel to the first line. This second line has an interior space with a second width that is less than the first width of the first line. Following that, a plurality of contiguous windows are formed in the interior space of the first line, and a transparent material of a second color that is lighter than the first color is applied in the interior of the first line and not in the interior space of the second line.

Ideally, the forming of the plurality of contiguous windows includes forming spaced transverse lines within the interior space. Alternatively, the contiguous windows are formed by alternatingly forming spaced clear windows and transparent colored windows of the second color in the interior space. Another option is to use the transverse lines and the application of the transparent color material of the second color, which is preferably a lighter color than the first color, to define windows that are enclosed entirely within the border lines.

It is to be understood that the present invention can be used with any tool having one or more lines or graduations used for measuring or marking or cutting, or any combination of the foregoing, where a single color of line is used. Thus, the invention is not to be limited to tools having composite lines formed thereon. As will be readily appreciated from the foregoing, the clear openings surrounded by opaque lines create a window to the actual material below. The opaque lines superimposed with a contrasting transparent color enables the tool to be used on light and dark surfaces. To enhance the use of the tool, alternating openings are also filled with the contrasting transparent color.

From the foregoing it will be appreciated that, although specific embodiments of the invention have been described herein for purposes of illustration, various modifications may be made without deviating from the spirit and scope of the present disclosure. Accordingly, the disclosure is not limited except as by the appended claims and the equivalents thereof.

The invention claimed is:

1. A device, comprising:
   a substrate having a plurality of parallel perimeter lines define a first line having an interior with a first width;
   a plurality of border lines within the interior of the first line that define a second line in the interior of the first line, the plurality of border lines formed to be visually contrasting to the first line, the second line having an interior space between the plurality of border lines that is of a second width that is less than the first width of the first line;
   a plurality of contiguous windows in the interior space of the second line.

2. The device of claim 1 further comprising spaced transverse lines within the interior space between the plurality of contiguous windows.

3. The device of claim 1 wherein the plurality of contiguous windows comprises alternatingly spaced clear windows and transparent windows of the second color in the interior space.

4. A ruler, comprising:
   a substrate having a working surface and an opposing viewing surface;
   a composite line formed of a first line of a first width and a second interior line of a second width, the first line having a perimeter line extending around the composite line, and the second line comprising an interior of the composite line that is surrounded by the first line and that is visually contrasting to the first line, the second line having a border line around a perimeter of the second line that is visually contrasting to the second line and the first line; and
   a plurality of transparent windows within the second line that enable viewing from the viewing surface to the working surface of the substrate.

5. The ruler of claim 4 in which the first line is of a first color and the second line is of a second color that is visually contrasting with the first color, and alternating windows of the plurality of transparent windows are of the contrasting lighter color than the first color and the second color to present a dashed line of alternating colored and transparent windows in the second line.

6. The ruler of claim 4 in which each window has first and second pairs of side lines, the first pair of side lines having a length that is equal to or longer than a length of the second pair of side lines, and in which the border line is formed only on the first pair of sides.

7. The ruler of claim 4 in which each window has first and second pairs of sides, the first pair of sides having a length that is longer than a length of the second pair of sides, and in which the border line is formed only on the second pair of sides.

8. The ruler of claim 4 in which each window has first and second pairs of sides, the first pair of sides having a length that is longer than a length of the second pair of sides, and in which the border line is formed on the first and second pairs of sides.

9. The ruler of claim 4 comprising a plurality of composite lines that include vertical composite lines and horizontal composite line formed at right angles to one another to create a grid of lines, and a transparent window at each intersection of a vertical line and horizontal line that has either a "T" shape or a cross shape.

10. A method, comprising:
    forming a first line on a substrate, the first line including parallel perimeter lines on the substrate that define an interior with a first width;
    forming a plurality of border lines that are visually contrasting to the perimeter lines and positioned within the interior of the first line that are parallel to the perimeter lines and that define a second line in the interior of the first line, the second line having an interior space between the border lines of a second width that is less than the first width of the first line;
    forming a plurality of contiguous windows in the interior space of the second line to present a dashed line of windows.

11. The method of claim 10 wherein forming the plurality of contiguous windows comprises forming spaced transverse lines within the interior space.

12. The method of claim 10 wherein forming the plurality of contiguous windows comprises forming alternatingly spaced clear windows and transparent windows of the second color in the interior space.

13. A device, comprising:
    a substrate of material;
    a first line on the substrate having an interior with a first width, the first line including a plurality of parallel perimeter lines of a first color;
    a second line in the interior of the first line, the second line including a plurality of parallel border lines of a second color that is different in color than the first color, the plurality of parallel border lines positioned within the interior of the first line, the parallel border lines being parallel to the perimeter lines and defining an interior space located between the parallel border lines, the interior space having a second width that is less than the first width of the first line;
    a plurality of contiguous transparent windows in the interior space of the second line.

14. The device of claim 13 wherein alternating windows of the plurality of contiguous transparent windows are of a transparent color and the remaining windows are clear.

15. The device of claim 13 wherein the substrate is transparent, and the substrate has a working surface and a viewing surface that is opposite to the working surface, and wherein the plurality of lines are applied to the working surface of the substrate.

* * * * *